US009515529B2

United States Patent
Lynch et al.

(10) Patent No.: US 9,515,529 B2
(45) Date of Patent: Dec. 6, 2016

(54) METHOD AND APPARATUS FOR PERMANENT MAGNET ATTACHMENT IN AN ELECTROMECHANICAL MACHINE

(71) Applicant: Northern Power Systems Utility Scale, Inc., Barre, VT (US)

(72) Inventors: Jonathan A. Lynch, St. Johnsbury, VT (US); Mark S. Piercey, Sudbury, MA (US); Peter P. Mongeau, Westborough, MA (US)

(73) Assignee: Northern Power Systems, Inc., Barre, VT (US)

( * ) Notice: Subject to any disclaimer, the term of this patent is extended or adjusted under 35 U.S.C. 154(b) by 625 days.

(21) Appl. No.: 13/837,358

(22) Filed: Mar. 15, 2013

(65) Prior Publication Data

US 2013/0200735 A1 Aug. 8, 2013

Related U.S. Application Data

(63) Continuation-in-part of application No. 12/543,153, filed on Aug. 18, 2009, now Pat. No. 8,664,819.

(51) Int. Cl.
*H02K 21/12* (2006.01)
*H02K 1/28* (2006.01)
(Continued)

(52) U.S. Cl.
CPC ............... *H02K 1/28* (2013.01); *F03D 9/002* (2013.01); *H02K 1/278* (2013.01); *H02K 1/32* (2013.01);
(Continued)

(58) Field of Classification Search
CPC ........... H02K 1/28; H02K 1/287; H02K 15/03
(Continued)

(56) References Cited

U.S. PATENT DOCUMENTS 5,369,325 A 11/1994 Nagate et al.
6,481,090 B1 11/2002 Franco et al.
(Continued)

FOREIGN PATENT DOCUMENTS

CN 1037646 C 3/1998
CN 101090213 A 12/2007
(Continued)

OTHER PUBLICATIONS

Related PCT International Patent Application No. PCT/US2010/045836 filed Aug. 18, 2010.
(Continued)

*Primary Examiner* — Hanh Nguyen
(74) *Attorney, Agent, or Firm* — Downs Rachlin Martin PLLC (57) ABSTRACT

An apparatus and method for the installation and removal of permanent magnets in a permanent magnet electromechanical machine, for example a wind turbine power unit generator. A magnet holder is mounted on a magnet carrying structure such as a rotor. Permanent magnets may be inserted into and removed from the magnet holder after the electromechanical machine is assembled. The magnet holders define passages for airflow between the inside top and magnet surface. In this manner, permanent magnets may be installed on the magnet carrying structure and provided with additional cooling via said passages. Further, the holders may be configured to secure the magnets by an interference fit, without using bolts or adhesives, to facilitate both assembly and removal for maintenance and repair.

10 Claims, 9 Drawing Sheets

(51) Int. Cl.
*H02K 1/32* (2006.01)
*H02K 15/03* (2006.01)
*F03D 9/00* (2016.01)
*H02K 1/27* (2006.01)
*H02K 7/18* (2006.01)

(52) U.S. Cl.
CPC ....... *H02K 15/03* (2013.01); *F05B 2220/7068* (2013.01); *F05B 2230/60* (2013.01); *H02K 7/1838* (2013.01); *H02K 2213/12* (2013.01); *Y02E 10/725* (2013.01); *Y02P 70/523* (2015.11); *Y10T 29/49009* (2015.01); *Y10T 29/49012* (2015.01)

(58) Field of Classification Search
USPC .................. 310/156.28, 156.29, 156.08, 156.3, 310/156.31, 52, 54, 58, 59, 64
See application file for complete search history.

(56) References Cited

U.S. PATENT DOCUMENTS

| | | | |
|---|---|---|---|
| 6,492,755 | B1 | 12/2002 | Jones |
| 7,042,109 | B2 | 5/2006 | Gabrys |
| 7,473,087 | B2 | 1/2009 | Steiner |
| 7,573,168 | B2 | 8/2009 | Carl, Jr. et al. |
| 7,768,169 | B2 | 8/2010 | Clark |
| 8,058,763 | B2 | 11/2011 | Clark et al. |
| 9,018,817 | B2 * | 4/2015 | Bradley ............ H02K 1/278 310/156.31 |
| 2003/0080640 | A1 | 5/2003 | Weiglhofer et al. |
| 2004/0150281 | A1 | 8/2004 | Malmberg |
| 2006/0040010 | A1 | 2/2006 | Steiner |
| 2007/0290564 | A1 | 12/2007 | Clark |
| 2008/0048517 | A1 | 2/2008 | Ochiai et al. |
| 2008/0150385 | A1 | 6/2008 | Silander |
| 2009/0146521 | A1 * | 6/2009 | Maki-Ontto ......... H02K 1/276 310/156.53 |
| 2011/0043065 | A1 | 2/2011 | Piercey et al. |

FOREIGN PATENT DOCUMENTS

| | | |
|---|---|---|
| EP | 2071704 A1 | 6/2009 |
| EP | 2410633 A1 | 1/2012 |
| JP | 61121748 | 6/1986 |
| JP | 7274419 | 10/1995 |
| JP | 08223835 | 8/1996 |
| JP | 09322446 | 12/1997 |
| JP | 2000116038 | 4/2000 |
| JP | 2003333774 | 11/2003 |
| JP | 20044023864 | 1/2004 |
| JP | 2007236160 | 9/2007 |
| WO | 2008046780 A2 | 4/2008 |
| WO | 2008116464 A2 | 10/2008 |

OTHER PUBLICATIONS

International Search Report and Written Opinion dated Oct. 20, 200, in related PCT/US2010/045836 filed Aug. 18, 2010.
Office Action dated Sep. 26, 2011, in connection with related U.S. Appl. No. 12/543,153, filed Aug. 18, 2009.
Response to Office Action dated Jan. 26, 2012, in connection with related U.S. Appl. No. 12/543,153, filed Aug. 18, 2009.
Final Office Action dated Mar. 15, 2012, in connection with related U.S. Appl. No. 12/543,153, filed Aug. 18, 2009.
Response to Final Office Action dated Jun. 15, 2012, in connection with related U.S. Appl. No. 12/543,153, filed Aug. 18, 2009.
Office Action dated Sep. 14, 2012, in connection with related U.S. Appl. No. 12/543,153, filed Aug. 18, 2009.
Response to Office Action dated Dec. 14, 2012, in connection with related U.S. Appl. No. 12/543,153, filed Aug. 18, 2009.
Office Action dated Feb. 26, 2013, in connection with related U.S. Appl. No. 12/543,153, filed Aug. 18, 2009.
Response to Office Action dated Jul. 26, 2013, in connection with related U.S. Appl. No. 12/543,153, filed Aug. 18, 2009.
Notice of Allowance dated Oct. 25, 2013, in connection with related U.S. Appl. No. 12/543,153, filed Aug. 18, 2009.
International Search Report and Written Opinion dated Aug. 13, 2014 in corresponding International Application No. PCT/US2014/025852, filed Mar. 13, 2014.

* cited by examiner

FIG. 10 ary embodiments of the present invention include
METHOD AND APPARATUS FOR PERMANENT MAGNET ATTACHMENT IN AN ELECTROMECHANICAL MACHINE

RELATED APPLICATIONS

The present application is a continuation-in-part of U.S. patent application Ser. No. 12/543,153 filed Aug. 18, 2009, which is incorporated by reference in its entirety herein.

TECHNICAL FIELD

The present invention generally relates to the field of permanent magnet machines, for example, wind power generators. In particular, embodiments of the present invention are directed to a holder for installing, containing and cooling permanent magnets within the rotor structure of a permanent magnet motor or generator.

BACKGROUND

Permanent magnet ("PM") electromechanical machines utilize permanent magnets to convert rotational inputs into electricity or electrical inputs into rotational motion. One example is wind power units (WPUs) that generate electricity from the energy in wind. Generally, a PM generator or motor has three components. A first component, a stator, is a cylindrical housing that contains electrical windings that remain immobile during electricity generation. A second component, a rotor, is a rotatable assembly containing permanent magnets that spin with respect to the stator. The relative movement between the rotor and the stator produces a moving magnetic field, which induces an electrical current in the stator electrical windings, thereby producing electricity. A third component, such as an axle, rotationally supports the rotor with respect to the stator, enabling the two to rotate relative to each other.

As with other electromechanical machines that use permanent magnets, the permanent magnets in WPUs are typically installed relatively early in the assembly process. While it may be convenient to install magnets early in the assembly process, the presence of high strength permanent magnets can make later stages of assembly and installation inconvenient and even dangerous. This situation arises because subsequent assembly and installation steps require use of, and transportation near, ferromagnetic materials that are strongly attracted to the permanent magnets. Further, the process of assembling the stator and the rotor can be more difficult because of the tight spacing at the machine airgap, and the high magnetic forces between the rotor and the stator. Such assembly of magnets can especially complicate field repair and service of WPUs due to remote locations and positioning at the top of high towers.

Permanent magnets are often fastened within PM machines using bolts or other similar mechanical means directly secured to the magnets. While bolting the magnet to the rotor does securely fasten the magnet, bolting also makes removal of the magnet during maintenance difficult by, for example, requiring disassembly of the generator in order to remove the bolts. Directly bolting the magnets may also remove magnetic material. Removal of magnetic material can change the magnetic flux characteristics, thereby altering electricity generation. Furthermore, removing magnetic material and using bolts risks damaging the magnet during generator assembly or maintenance because of the stresses exerted on the magnet. These factors increase the effort and expense required to maintain a PM electromechanical machine, especially a WPU located in the field.

Another challenge in the design of PM machines is temperature control. As is well known in the art, managing magnet temperature is important, among other reasons, to protect against demagnetization during machine operation, and to allow the use of lower cost magnets. For example, a ten degree Celsius decrease in magnet operating temperature may provide a reduction in magnet cost in the range of about $25,000 for a large, permanent magnet machine utilizing rare earth alloy magnets. While many cooling schemes have been proposed, often they are complex or ineffective in practice. But even when a cooling scheme is effective to an extent, further efficiencies still can be achieved by additional temperature control means if such means can be cost effectively incorporated into the design without adding undue complexity.

SUMMARY OF THE DISCLOSURE

Exemplary embodiments of the present invention include methods, systems, and apparatus for securing magnets within a PM electromechanical machine, and assembling a generator, including securing the permanent magnet within the generator assembly after it is otherwise completed. When a magnet is secured according to embodiments of the present invention, the magnet can be removed and replaced as needed, thereby simplifying maintenance. In one exemplary embodiment, a magnet holder mounted in a PM machine is configured and dimensioned in combination with a magnet mounting surface and the magnet to produce an interference fit with the magnet.

In one implementation, the present disclosure is directed to an apparatus. The apparatus includes: a rotor assembly in a permanent magnet electromechanical machine including: a rotor having plural magnet mounting surfaces; a plurality of magnet holders, one at each magnet mounting surface on the rotor, each magnet holder having a top inside surface; a plurality of magnets, one each retained on the magnet mounting surfaces within a magnet holder, each magnet having a top surface opposite the magnet mounting surface; and at least one void defined between the holder top inside surface and the magnet top surface, the at least one void occupying about 90% to 100% of the space between the surfaces.

In another implementation, the present disclosure is directed to a method. The method includes: mounting permanent magnets to a magnet carrying structure in an electromechanical machine, including: providing a magnet holder having a top portion and sides defining at least a first open end, the top portion having an inside surface; sizing the magnet holder and configuring the top portion inside surface in combination with the magnet to provide an interference fit between the magnet holder and the magnet along facing surfaces thereof when the magnet is retained by the magnet holder on the magnet carrying structure, the interference fit being configured to maintain at least about 90% of the facing surfaces in a spaced apart relationship defining void space there between; mounting the magnet holder on the magnet carrying structure; and sliding the magnet into the magnet holder through the first open end to secure the magnet on the magnet carrying structure by the interference fit.

In still another implementation, the present disclosure is directed to an apparatus. The apparatus includes: a magnet holder for securing permanent magnets to a magnet mounting surface on a rotor in an electromechanical machine, wherein the magnets have a height and width, the magnet holder including a body having side walls joined by a closed top to define at least a first open end and open bottom, wherein the sides and closed top together define a magnet holder inside height configured and dimensioned in combination with the magnet height and magnet mounting surface to define at least one void between the closed top and the magnet, the at least one void occupying about 90% to 100% of the space between the surfaces when the magnet is retained on the magnet mounting surface within the magnet holder.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

As will be seen, the exemplary embodiments of methods, systems, and apparatus implementing the present disclosure are varied in terms of where and how permanent magnets may be inserted into an electromechanical machine after the machine has been assembled. While a number of particular examples are presented below to illustrate the breadth of the disclosure, those skilled in the art will appreciate the large number of variations.

Figure 1A:
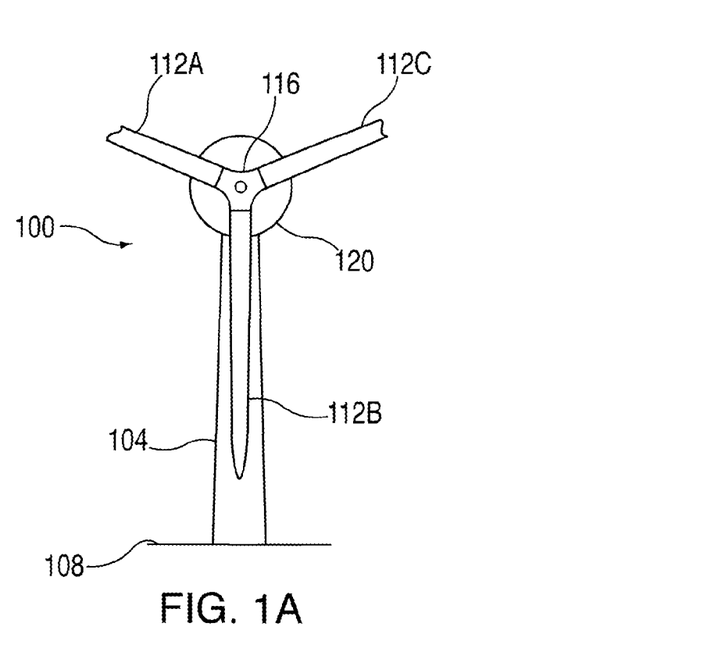
FIG. 1A is a front elevational view of a WPU.
Figure 1B:
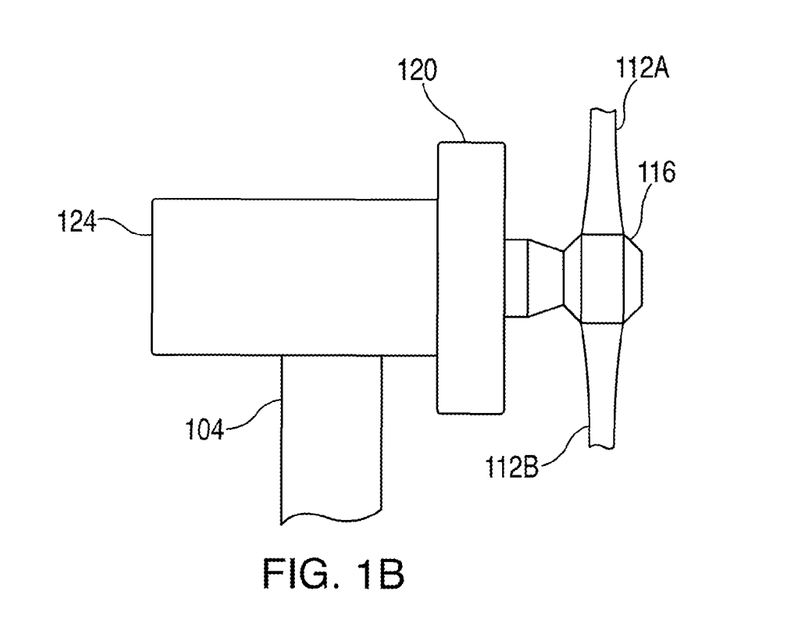
FIG. 1B is a side elevational view of a WPU.

For illustration purposes only, embodiments of the invention are described herein with reference to WPU embodiments. As depicted in FIGS. 1A and 1B, WPU 100 has a tower 104 supported by a surface 108, three airfoils ("blades") 112A-C connected to a hub 116, a generator 120, and a nacelle 124. Tower 104 elevates blades 112A-C to a sufficient height above surface 108 to access wind currents that are both sufficiently strong and persistent so as to turn the blades for production of electricity. While the example depicted in FIGS. 1A and 1B has three blades, other designs may have additional blades or fewer blades. Electricity is produced by connecting a rotor to the blades via a hub and a rotational support structure, such as an axle, and enabling relative rotation between the rotor and the stator.

Figure 2A:
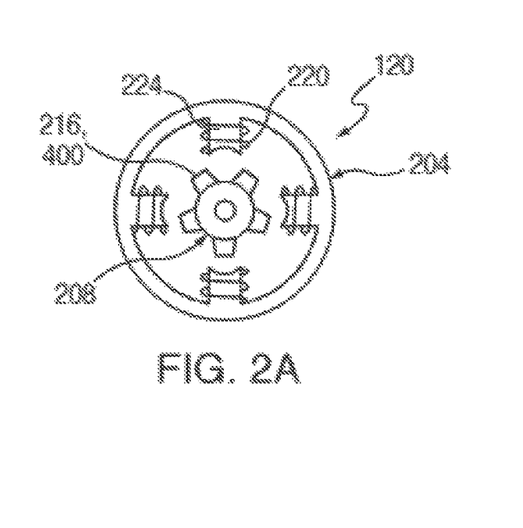
FIG. 2A is a schematic cross-sectional view of a generator, as can be used in a WPU.
Figure 2B:
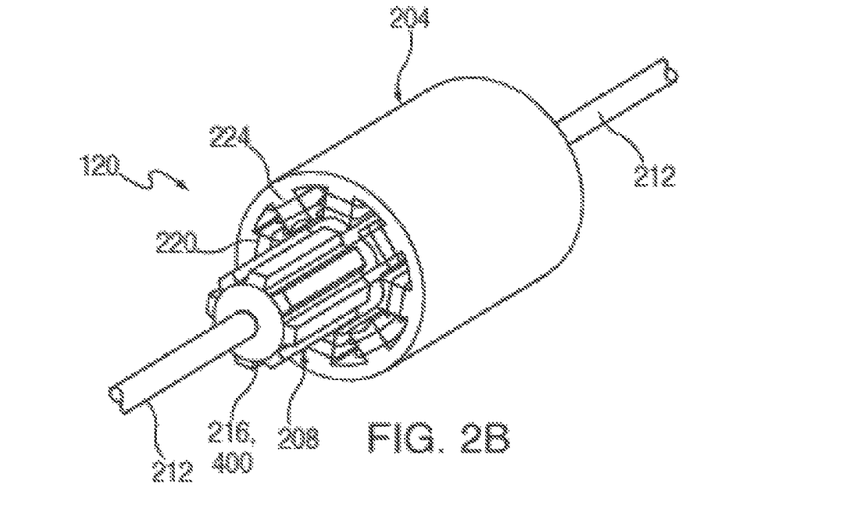
FIG. 2B is a schematic view of a generator, as can be used in a WPU.

As shown in FIGS. 2A and 2B, an exemplary generator 120 includes rotor 208 disposed within stator 204. Other examples not shown may dispose the stator within the rotor. Magnets are mounted on a magnet carrying structure such as the rotor or stator depending on the particular design. In the presently illustrated embodiment, permanent magnets 216 are mounted on the surface of rotor 208 via holders 400 (described below). Rotor 208 rotates with a rotation support structure, in this example axle 212. Electrical windings 220 are attached to cores 224 that are arranged around the inner circumference of stator 204. As discussed previously, the force exerted on blades 112A-C by the wind rotates hub 116 and, in this example, axle 212. As axle 212 turns, it rotates rotor 208. The rotating permanent magnets 216 disposed on rotating rotor 208 induce a current in the surrounding electrical windings 220. The rotating magnets must be securely fastened to the rotor.

Figures 3, 3A, 3B:
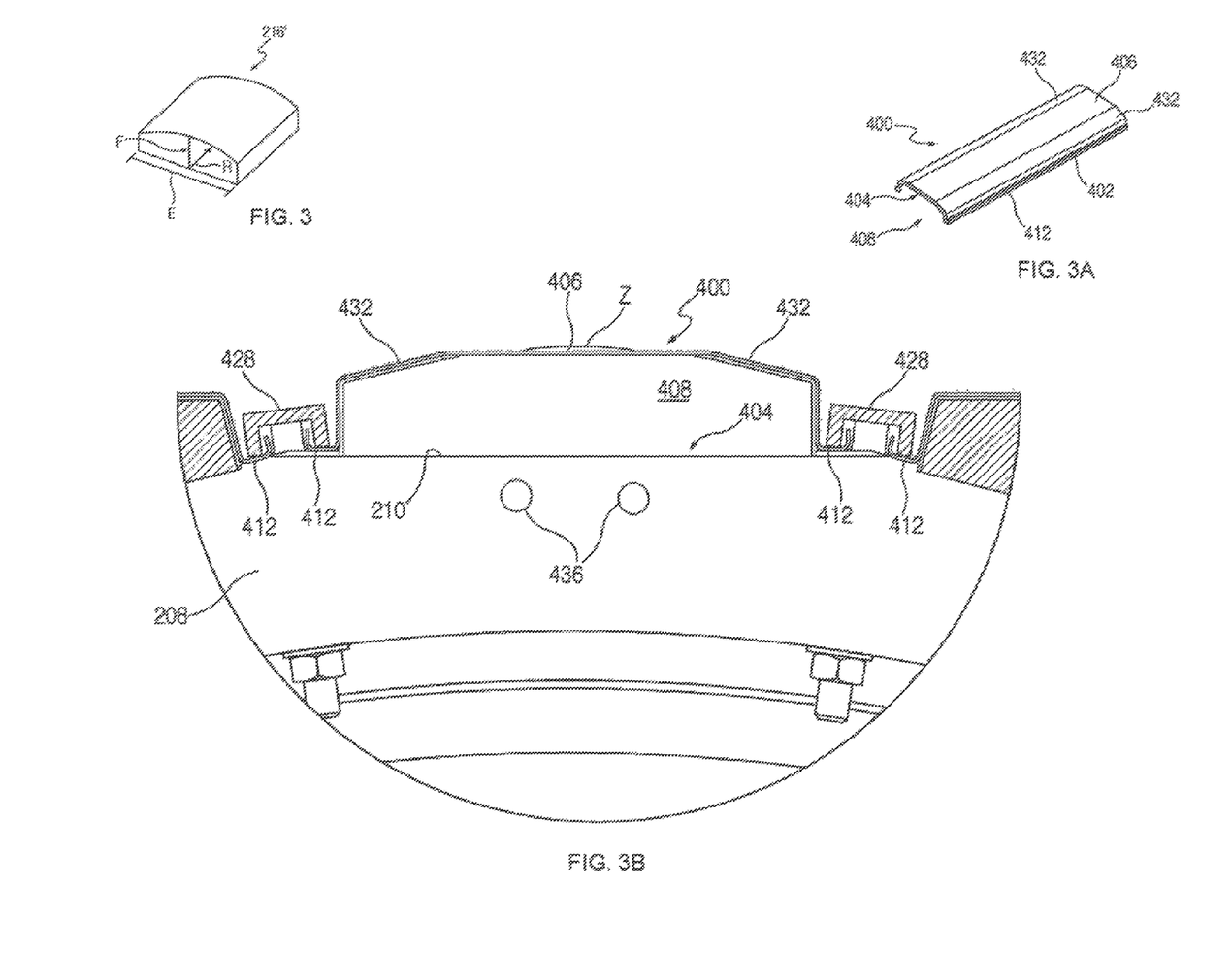
FIG. 3 is an isometric view of a permanent magnet section.
FIG. 3A is an isometric view of a magnet holder according to an exemplary embodiment of the present invention.
FIG. 3B is a schematic end view of a magnet and magnet holder positioned on a rotor with the magnet holder overlaid on an outline of a magnet to illustrate the overlap between the height dimensions that creates an interference fit in one exemplary embodiment.

Permanent magnets 216, as mounted on rotor 208, may be divided into sections 216' for ease of installation and handling as shown in FIG. 3. Permanent magnet section 216' may be a neodymium alloy permanent magnet. Other embodiments can be made from any suitable magnetic material including iron, iron alloys, and rare-earth element alloys. The magnet shape may be designed to, among other things, optimize electricity generation by tailoring the magnetic flux density exposed to the stator windings. The magnet shape may also be suitable for insertion into magnet holder 400 through an access door in a stator back plate for maintenance and repair in the field after initial assembly as described hereinafter (see FIGS. 9 and 10). The magnet and magnet holder typically would be designed in conjunction with each other to ensure proper fit. In this exemplary embodiment, permanent magnet section 216' has a square plan-view perimeter of width E, and a convex top surface having height F and radius R. Other exemplary embodiments of permanent magnet section 216' cross-section and plan view perimeters include square, rectangle, trapezoidal, elliptical plan-view perimeters, and magnets with radiused or chamfered edges.

Figure 4A:
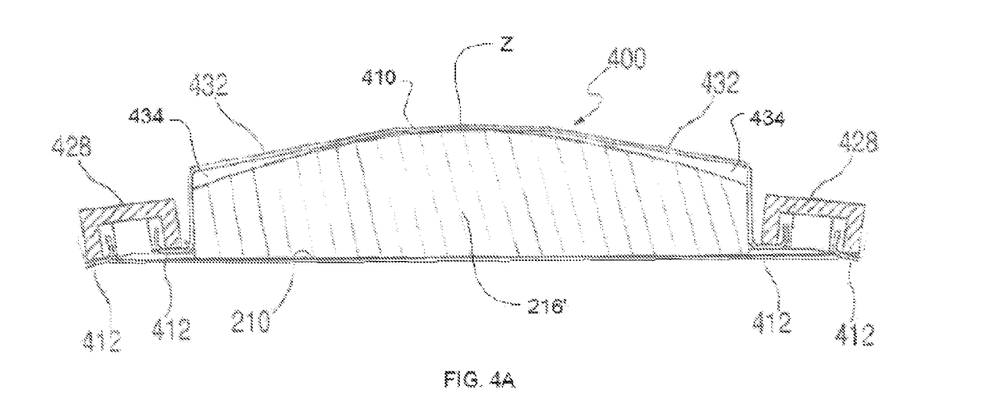
FIG. 4A is an end view of a magnet holder mounted on a rotor and securing a magnet or magnet section according to an exemplary embodiment of the invention.

According to embodiments of the present invention, magnet holders are used to secure the magnets via an interference fit between an inside surface of the top of magnet holder and the top surface of the magnet. The interference fit into the magnet holder provides a biasing force to secure the magnet within the holder. In one exemplary embodiment of the present invention as illustrated in FIG. 4A, magnet holder 400 has longitudinally extending sides 402 joined by a closed top 406 to define an open bottom 404 and opposed open ends 408. Alternatively, one end of magnet holder 400 may be closed. Edge flanges 412 may be formed along the lower edge of each side 402 to facilitate mounting of the holders as described below. Magnet holder 400 may be made from austenitic stainless steel or any non-ferromagnetic material, such as ceramic, plastic, fiberglass, or other composite material.

Figure 7:
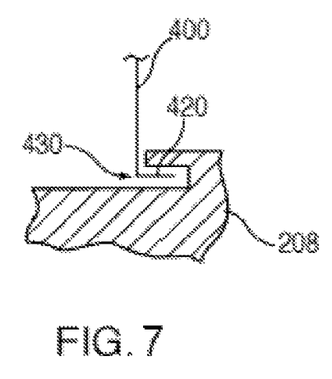
FIG. 7 is a partial detail view of an alternative embodiment for mounting a magnet holder.

As shown, for example, in FIGS. 3A, 3B and 4A holders 400 may be mounted on rotor 208 using U-shaped clamping bars 428 bolted down against edge flanges 412. Other suitable securing means, such as welding sides 402 directly to the rotor, may be used. In yet other examples, a tab 420 on holder 400 may be inserted into a slot 430 on the rotor 208 to secure the holder as shown in FIG. 7. The dimensions of holder 400, selected in combination with its mounting height on rotor 208, are designed to cause an interference fit between permanent magnet 216, the magnet holder, and the rotor. Thus, in an exemplary embodiment, the distance between rotor surface 210 and closed top 406 is less than the cross-sectional height of magnet 216. An illustrative example provided below describes one possible set of dimensions to provide such an interference fit. Other suitable dimensions may be determined by persons skilled in the art based on the teachings herein. Longitudinal facets 432 may be formed in top 406 on either side of central portion 410 to facilitate flexing of the magnet holder top to ease insertion of the magnets while maintaining a secure interference fit along a line of contact between central portion 410 and top surface of the magnet. Facets 432 also help to form void spaces or air channels above the magnet to facilitate cooling as discussed below.

In one non-limiting example, with reference to FIGS. 3B and 4A, the combination of magnet and magnet holder may have the following dimensions: The magnet height may be approximately 21 mm, while the inside magnet holder height may be approximately 18.5 mm. In this example, the surface on which magnet sections 216' are seated is approximately 1 mm higher than the adjacent channels in the rotor surface where edge flanges 412 are seated. With this arrangement, an interference is created at point Z with line to line contact between the magnet and holder. The interference may be about 1 mm. The amount of interference is preferably selected so that deformation of magnet holder 400 remains in an elastic deformation zone to facilitate removal and replacement of magnet sections 216' for maintenance and repair. In another exemplary embodiment, the interference between the magnet and magnet holder is between about 0.5 and 1.7 mm. It will be readily apparent to persons skilled in the art that line to line contact as used herein does not refer to a theoretical line of zero or infinite width, but rather contact along a line, in other words a narrow surface extending in the longitudinal direction of the magnet holder that is substantially longer than its width, thus forming a line of contact with a measurable width substantially less than the overall width of the magnet holder top. In some embodiments, such line contact may have a width in the range of <1 mm to about 45 mm.

As can be seen, for example, in FIG. 4A, with the shape of magnet holder 400 as described, line contact between magnet and inside surface of the magnet holder top at Z creates voids 434 to either side of the line of contact. Voids 434 act as a thermal barrier to reduce heat transfer from the machine stator across the air gap to the rotor magnets. The air spaces or channels created by voids 434 act as a thermal break for heat transfer from the stator to the magnets. Direct heat conduction between the magnet holder and the magnet is interrupted by the air channels, thus providing a temperature differential between the holder and the underlying magnet, allowing cooler operation of the magnets during machine operation. Depending on the geometry used to create the voids between the magnet and the magnet holder, airflow could be induced axially through this space using either passive or active means, providing additional cooling to the magnets. Passive means may be provided simply as a result of rotation of the rotor and air flow around and through the magnet holders induced thereby. Active means may include the addition of fans or blowers to aid in forcing air through the air channels.

Analysis of computer models based on embodiments such as shown in FIG. 4A indicate that the temperature reduction in the magnets at steady state operation can be as much as 8° C. or greater depending on factors such as size of magnets and the turbine and operating parameters such as speed and power generation level. For computer modeling, stainless steel (thermal conductivity 13 W/m·° C.) was used as the assumed material for the magnet holder and the thickness of the top was assumed to be about 0.38 mm. Because of the line contact between the magnet holder inside surface and the top of magnet sections, the heat transfer characteristics between those surfaces are predominated by the characteristics of the voids (i.e. voids 434) such that the boundary could be modeled as equivalent to a uniform air space (thermal conductivity about 0.031 W/m·° C.) with a thickness of about 0.25 mm. The computer model, however, did not take into account airflow through the voids; thus it could be expected that in operation the reduction in magnet temperature may be even greater.

Figure 4B:
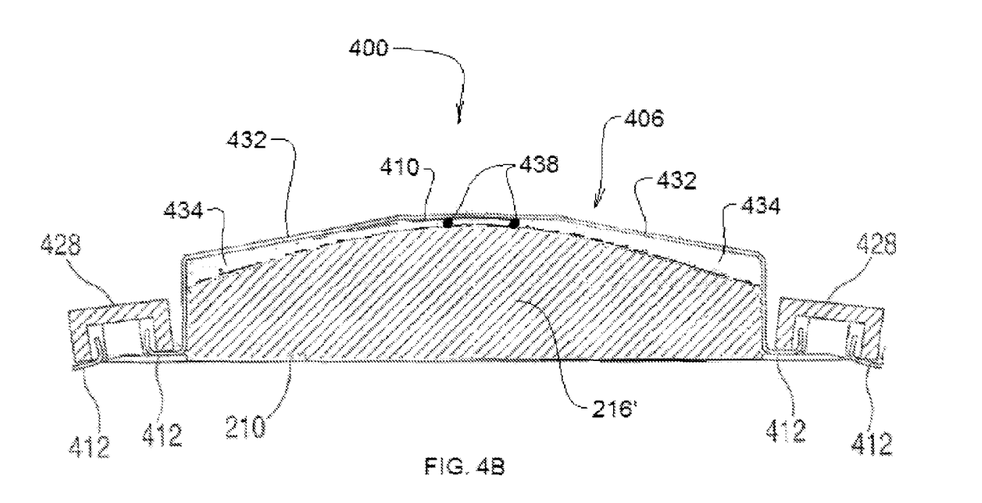
FIG. 4B is an end view of a magnet holder according to an alternative embodiment of the present invention, also mounted on a rotor and securing a magnet or magnet section.

In order to increase the thermal barrier provided by voids 434, the voids themselves may be increased in size as will be appreciated by persons of ordinary skill in the art based on the teachings set forth herein. In one alternative exemplary embodiment, as shown in FIG. 4B, dimples 438 may be provided on the inside surface of magnet holder central portion 410. Dimples 438 hold central portion 410 away from the top surface of magnet 216 joining voids 434 to create a continuous air space across the top of the magnet.

Figure 5A:
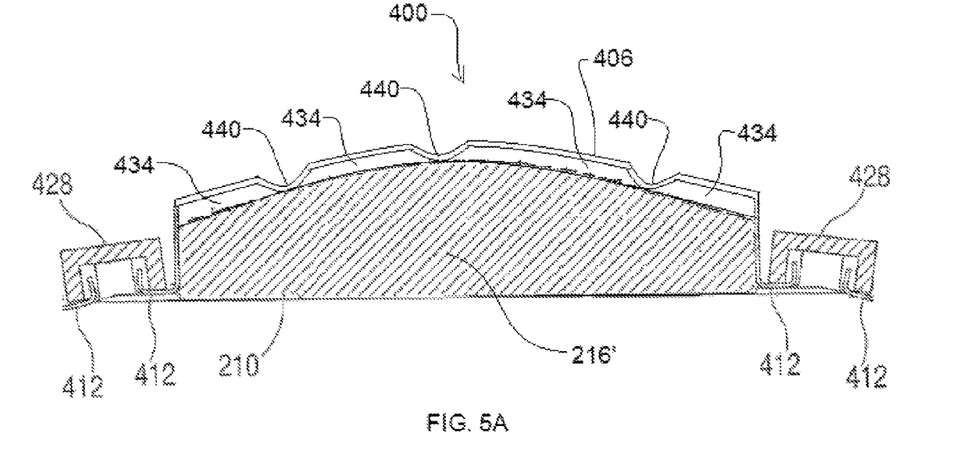
FIGS. 5A-5E are end views of further magnet holders according to alternative embodiments of the present invention, again each mounted on a rotor and securing a magnet or magnet section in accordance with teachings of the present invention.
Figure 5B:
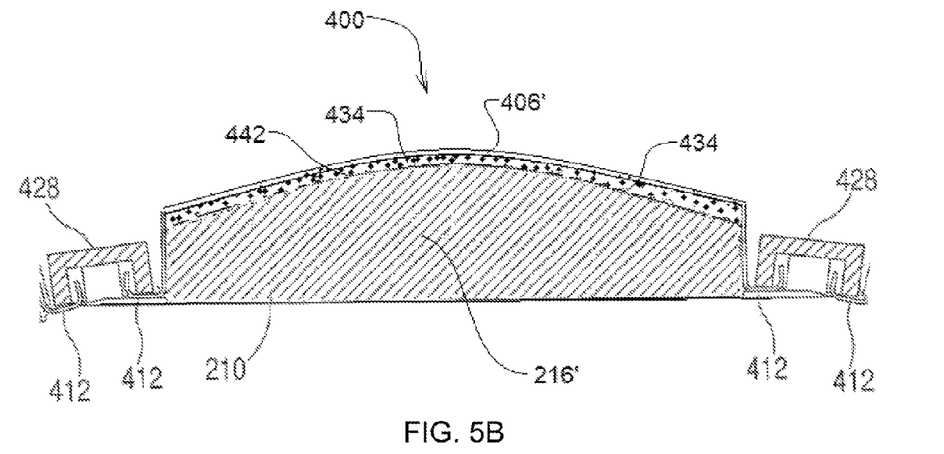

FIGS. 5A and 5B illustrate further alternative embodiments of the present invention wherein the magnet holder does not utilize longitudinal facets 432 along the top 406'. Instead, top 406' may be shaped generally to conform to the shape of the top surface of magnet 216 (or any other desired shape), with holding force provided by a series of ridges 440 (FIG. 5A) or porous material 442 that forms a plurality of air channels (FIG. 5B). The ridges or porous material space the inside of top 406' away from the magnet to form voids 434 as previously described. Ridges 440 also form a series of line contact areas between voids 434. Examples of porous material may include screens, woven material or baffles, or other suitable materials with low thermal conductivity that will form and support voids forming air channels between magnet sections 216' and top 406' of magnet holder 400. It will also be appreciated that dimples 438 as shown in FIG. 4B may be substituted for ridges 440 or porous material 442 as used in the embodiments of FIGS. 5A and 5B and vice versa.

In embodiments with conforming-shaped top 406', as in the exemplary embodiments of FIGS. 5A and 5B, dimples 438, ridges, 440, porous material 442 or other suitable protrusions or void creating material may be elastically deformable to provide holding force for retaining magnet 216 within magnet holder 400. The necessary holding force may be provided by an interference fit based on parameters as previously described. Alternatively, the protrusions may be substantially non-deformable and elastic deformation to create an interference fit provided by the magnet holder top 406', again based on parameters previously described.

Figure 5C:
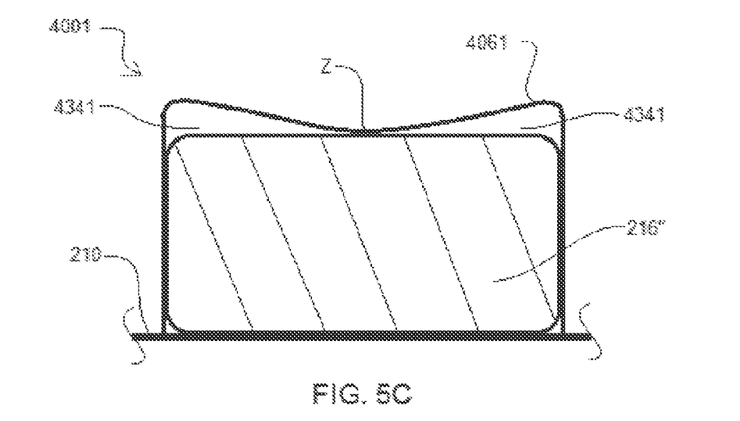
Figure 5D:
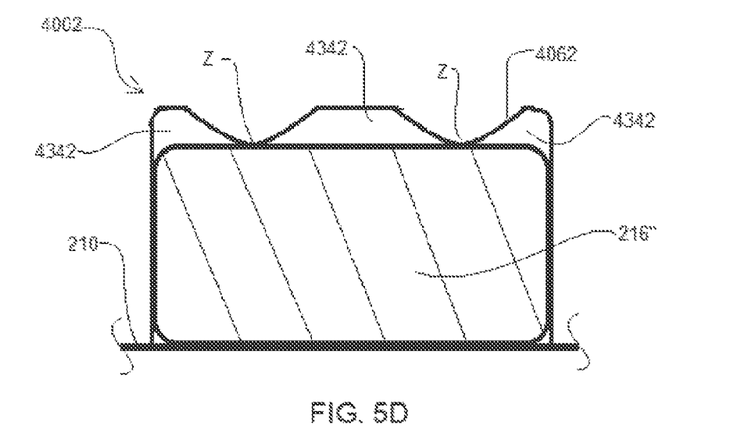
Figure 5E:
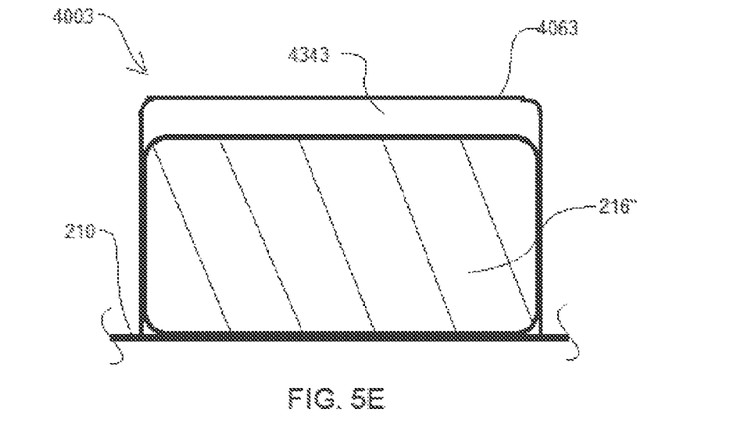

Other alternative embodiments may be configured for use with a magnet having a rectangular cross-section as shown, for example, in FIGS. 5C, 5D and 5E. In one embodiment, shown in FIG. 5C, magnet holder 4001 is provided with an inwardly shaped or concave top 4061 configured and dimensioned in combination with rectangular magnet 216" to form line contact with the magnet along a central line at Z. Line contact along line Z forms two voids 4341, one to either side of the line contact to facilitate magnet cooling as previously described. In another embodiment, shown in FIG. 5D, magnet holder 4002 is provided with two (or more) inwardly shaped or concave portions in top 4062, to form two (or more) lines of contact along lines Z. With two concave portions, three voids 4342 are formed along the top of the magnet.

In a further embodiment, shown in FIG. 5E, magnet 216" is held in place primarily or completely by its own magnetic attraction to rotor 210. In this embodiment there is no need for an interference fit with the top 4063 of holder 4003. In such a case, a single void 4343 occupies the entire area above magnet 216" to further increase the cooling effect as described and also provide a backup retaining means in the event of loss of magnetization of a magnet.

Based on the teachings herein, persons of ordinary skill in the art will appreciate that the amount of void space as compared to areas of contact for interference fit purposes will vary according to particular design requirements. In general, the amount of contact area between the top surface of the magnet and the magnet holder inside the top surface will be minimized to the extent that the heat transfer characteristics of the boundary between the magnet and magnet holder are at least substantially determined by the heat transfer characteristics of the void space. In an exemplary embodiment, at least about 90% of the top surface, or more preferably at least about 95% of the top surface of the magnet should be in communication with voids forming air channels. In some embodiments the area of the top surface of the magnet in communication with voids may be as large as between about 99-100% of the total surface.

In another alternative embodiment, a reflective, low emissivity outer surface may be provided on magnet holders 400 to add a radiation barrier between the stator across the machine air gap to the magnet holders, reducing the temperature rise of both the holders and the magnets. This property can be attained by using a smooth or polished surface with no paint or anodizing on the outer surface of the magnet holder facing the air gap. A further alternative would be to metallize the outer surface of a nonmetallic magnet holder, increasing its reflectivity and decreasing its emissivity.

Figure 6:
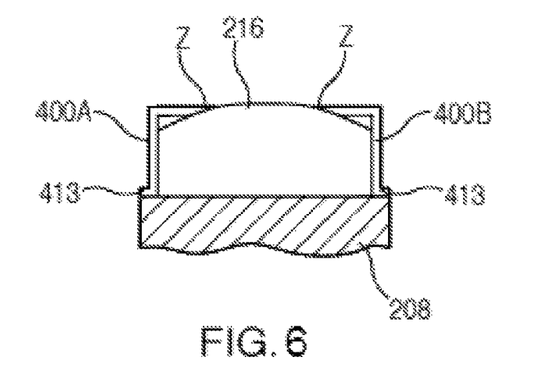
FIG. 6 is a schematic cross-sectional view of a further alternative embodiment of magnet holder.

As will be apparent to those of skill in the art, other arrangements of geometries, dimensions and interference fits between the magnet holders 400 and magnets 216 or magnet sections 216' may be selected based on the teachings contained herein without departing from the scope of the present invention. For example, rather than having a closed top, the magnet holder may be formed with an open top, in other words essentially as two inverted L-shaped sides 400A, 400B with inwardly directed flanges separated by a gap defining a top surface. These inwardly directed flanges maintain the magnets by interference along the base of each inverted L (line contact indicated at points Z) as shown in FIG. 6. Also in FIG. 6, sides 400A and 400B are welded directly to rotor 208 along bottom edge welds 413. In another alternative, rather than individual, separate holders secured at each magnet location, a single-piece holder may be formed with bent sides and tops that extend around the entire rotor. This embodiment could appear essentially as shown in FIG. 3B except that the separate holders would be integrally joined in the area of flanges 412.

Figure 8:
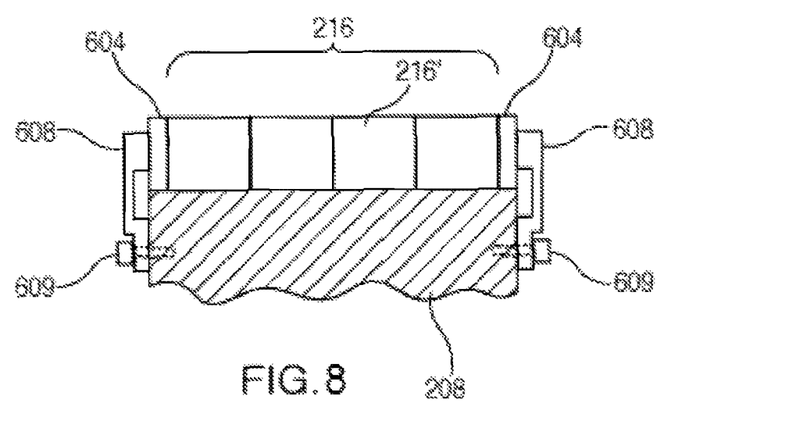
FIG. 8 is a partial cross-sectional view of permanent magnet sections disposed within a magnet holder on a rotor surface in accordance with embodiments of the present invention.

FIG. 8 illustrates an exemplary arrangement of magnet sections 216' on rotor 208 as inserted into a magnet holder, but with the holder omitted for clarity. In this embodiment, four magnet sections 216' are disposed within each magnet holder 400, however the number of magnet sections may be more or less than four depending on the design of generator 120, magnet 216, and magnet holder 400. This exemplary embodiment also illustrates the use of end-caps 604 and end flanges 608. A first end-cap 604 is installed preceding insertion of a first magnet section 216'. A second end-cap 604 is inserted into the holder after the insertion of the last magnet section 216'. End-caps 604 space and protect the magnet sections from end flanges 608 that are bolted to rotor 208 via bolts 609 and bolt holes 436 (shown in FIG. 3B). In other embodiments, a first end-cap 604 may be integrated into magnet holder 400 or on rotor 208 so as to remove the need to insert the first end-cap with magnet sections 216'.

Figure 9:
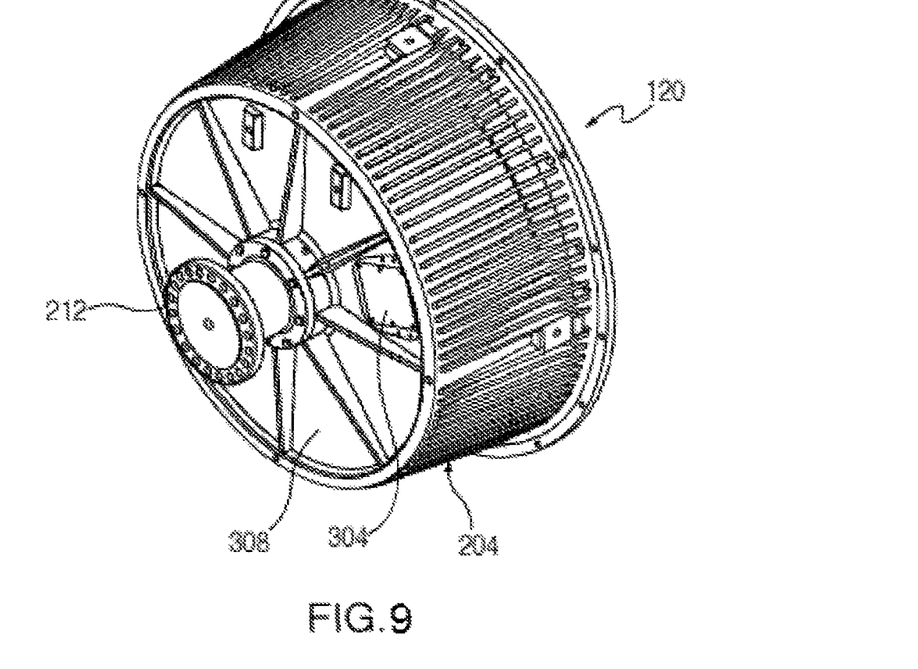
FIG. 9 is an isometric view of a WPU generator assembly.
Figure 10:
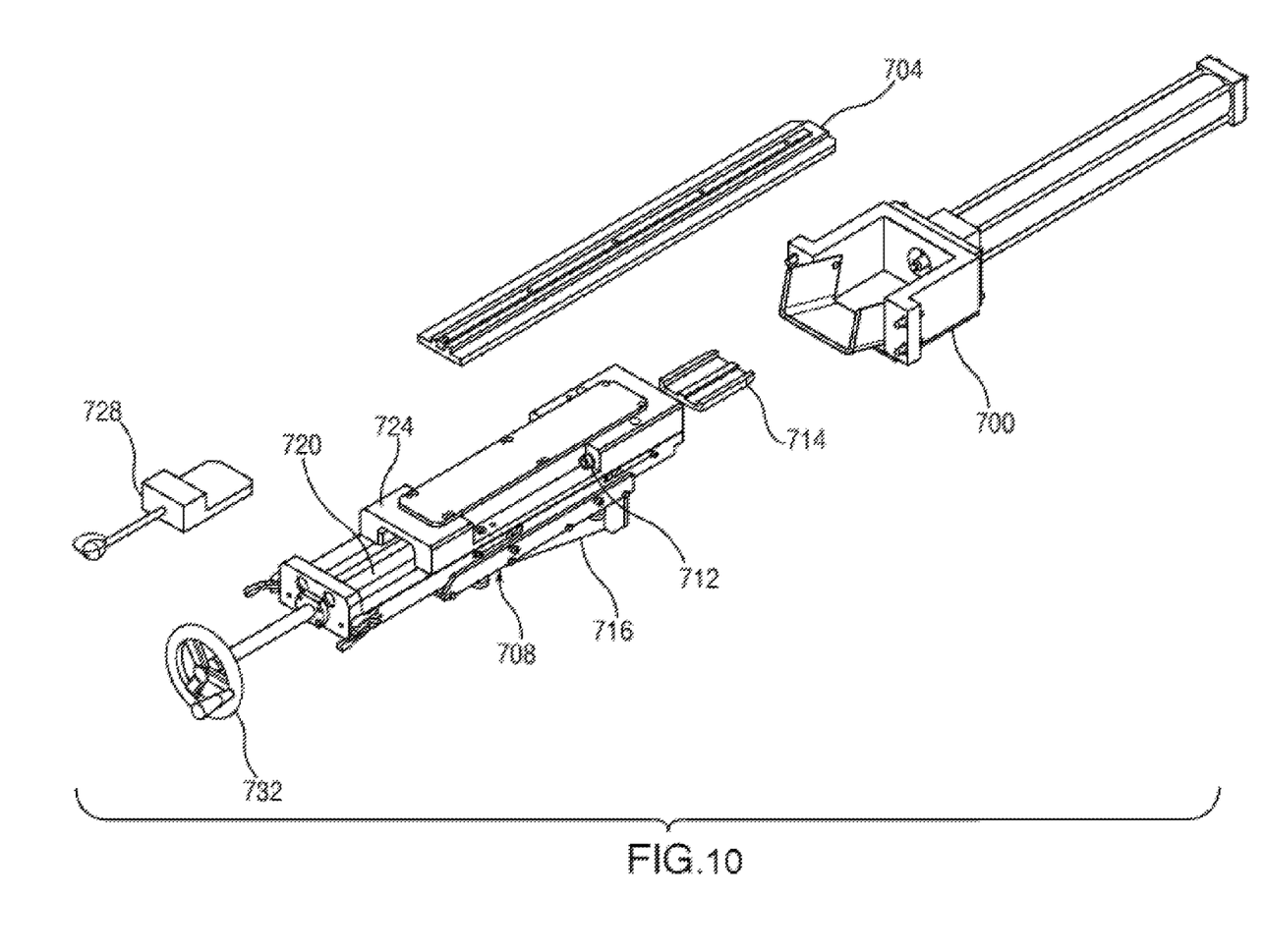
FIG. 10 is an isometric view of components used to insert magnets into an assembled WPU generator through a magnet access door in accordance with embodiments of the present invention.

An exemplary embodiment of a method for inserting magnets into an electromechanical machine such as a WPU generator according to the present invention will now be described in connection with FIGS. 9 and 10. As shown in FIG. 9, in an assembled generator 120, rotor 208 (not visible) is nested within stator 204 with axle 212 passing through both the rotor and the stator. The back of stator 204 is closed by a back plate 308, while the opposite, front is open. An access door 304 is provided in stator back plate 308. As a preliminary step to insertion, back force assembly 700 is connected to magnet access door 304 in stator back plate 308. Back force assembly 700 extends through the door and helps support the magnet holder during the initial insertion process. On the opposite side of generator 120, the face of rotor 208 is open to expose one end of magnet holders 400 for insertion of magnets 216. An exemplary insertion process begins first by inserting alignment plate assembly 704 into magnet holder 400 on the side opposing back force assembly 700 in order to confirm alignment. After alignment has been confirmed, alignment plate assembly 704 is withdrawn and load tray assembly 708 is connected to rotor 208. Load tray assembly 708 is attached to rotor 208 using screws 712. Loader support assembly 716, also secured to rotor, is mounted adjacent to magnet holder 400 to be filled. If desired, nose block tool 714 can be pushed into the magnet holder using pushing tool 728 in order to open the magnet holder 400 to facilitate insertion of magnets, for example by reducing the need for a chamfered end on the magnets. Once load tray assembly 708 is stabilized, a first end cap 604 is inserted into loading channel 720 followed by magnet sections 216'. Magnet sections 216' are pushed under load tray cover 724 using pushing tool 728. A second end cap 604 is placed into loading channel 720 after last magnet section 216' has been placed into the loading channel. Pushing tool 728 is then placed into loading channel 720 and connected to screw drive 732. Screw drive 732 is then used to push magnet sections 216' and end caps 604 into magnet holder 400. Insertion of magnet sections 216' and end caps 604 is complete when first end cap 604 contacts a first end flange 608 connected to rotor 208, the end flange acting as a stop. After insertion is completed with contact to the first end flange 608, a second end flange 608 is mounted to rotor 208 at the opposite end of rotor. While load tray assembly 708 uses a screw drive 732 to advance magnet sections 216' and end caps 604, the magnets and end caps could also be advanced by a motor driven actuator, a pneumatically driven actuator, or a hydraulically driven actuator. After magnets 216 are installed door 304 can later be used for access to the magnets during maintenance procedures.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A rotor assembly in a permanent magnet electromechanical machine, comprising:
   a rotor having plural magnet mounting surfaces;
   a plurality of magnet holders, one at each magnet mounting surface on the rotor, each magnet holder having a top inside surface;
   a plurality of magnets, one each retained on said magnet mounting surfaces within a magnet holder, each said magnet having a top surface opposite the magnet mounting surface; and
   at least one void defined between said holder top inside surface and said magnet top surface, said at least one void occupying about 90% to 100% of the space between said surfaces.

2. A rotor assembly in a permanent magnet electromechanical machine, comprising:
   a rotor having plural magnet mounting surfaces;
   a plurality of magnet holders, one at each magnet mounting surface on the rotor, each magnet holder having a top inside surface;
   a plurality of magnets, one each retained on said magnet mounting surfaces within a magnet holder, each said magnet having a top surface opposite the magnet mounting surface; and
   at least one void defined between said holder top inside surface and said magnet top surface, said at least one void occupying about 90% to 100% of the space between said surfaces,
   wherein said holder top inside surface is spaced from the rotor mounting surface by a first predetermined height and said magnet top surface is spaced from said rotor mounting surface by a second predetermined height greater than said first predetermined height of the magnet holder to form an interference fit between the holder top inside surface and the magnet top surface.

3. The rotor assembly of claim 2, wherein said holder top inside surface and said magnet top surface are configured in combination to form said interference fit as a line contact between said surfaces.

4. The rotor assembly of claim 3, wherein said at least one void comprises two voids occupying between about 99% and 100% of the space between said surfaces.

5. The rotor assembly of claim 3, wherein said holder top inside surface and said magnet top surface are configured in combination to form interference fits along plural lines of contact.

6. The rotor assembly of claim 5, wherein said holder top inside surface is configured to form plural ridges forming said interference fit with said magnet, with plural said voids defined by said ridges.

7. The rotor assembly of claim 2, wherein said at least one void is occupied by a porous spacing material allowing for air flow therethrough and forming the interference fit between said surfaces.

8. The rotor assembly of claim 2, wherein said top portion inside surface includes dimples configured to form said interference fit with the magnet top surface.

9. A rotor assembly in a permanent magnet electromechanical machine, comprising:
   a rotor having plural magnet mounting surfaces;
   a plurality of magnet holders, one at each magnet mounting surface on the rotor, each magnet holder having a top inside surface;
   a plurality of magnets, one each retained on said magnet mounting surfaces within a magnet holder, each said magnet having a top surface opposite the magnet mounting surface; and
   at least one void defined between said holder top inside surface and said magnet top surface,
   wherein said at least one void forms air flow passages for cooling said magnet.

10. The rotor assembly of claim 9, wherein said at least one void occupies about 90% to 100% of the space between said surfaces.

* * * * *